(No Model.) 6 Sheets—Sheet 1.

G. D. MORSE & M. & DE F. W. CHASE.
AUTOMATIC SALESMAN AND CHANGE MAKER.

No. 447,343. Patented Mar. 3, 1891.

(No Model.) 6 Sheets—Sheet 4.

G. D. MORSE & M. & DE F. W. CHASE.
AUTOMATIC SALESMAN AND CHANGE MAKER.

No. 447,343. Patented Mar. 3, 1891.

Fig. 6.

(No Model.) 6 Sheets—Sheet 5.

G. D. MORSE & M. & DE F. W. CHASE.
AUTOMATIC SALESMAN AND CHANGE MAKER.

No. 447,343. Patented Mar. 3, 1891.

(No Model.) 6 Sheets—Sheet 6.

G. D. MORSE & M. & DE F. W. CHASE.
AUTOMATIC SALESMAN AND CHANGE MAKER.

No. 447,343. Patented Mar. 3, 1891.

UNITED STATES PATENT OFFICE.

GEORGE D. MORSE, MILTON CHASE, AND DE FOREST W. CHASE, OF HAVERHILL, MASSACHUSETTS.

AUTOMATIC SALESMAN AND CHANGE-MAKER.

SPECIFICATION forming part of Letters Patent No. 447,343, dated March 3, 1891.

Application filed March 14, 1890. Serial No. 343,833. (No model.)

*To all whom it may concern:*

Be it known that we, GEORGE D. MORSE, MILTON CHASE, and DE FOREST W. CHASE, citizens of the United States, residing at Haverhill, in the county of Essex and State of Massachusetts, have invented certain new and useful Improvements in an Automatic Salesman and Change-Maker, of which the following, taken in connection with the accompanying drawings, is a specification.

The object of our invention is to produce an automatic salesman and change-maker whereby newspapers, packages of merchandise, or change will be automatically delivered upon dropping the proper coin into the apparatus.

The invention consists of various details of construction, hereinafter fully set forth, and pointed out in the claims.

Referring to the accompanying drawings, Figs. 8 to 24 are detail views of various parts and modifications, as hereinafter fully described.

A represents the case, of wood or other suitable material, and B a door at the rear of same.

C is a shelf or support secured in the desired position in the casing A, and D D are two rods or bars that extend from the shelf C to the top of the casing A, the width between the rods D being regulated by the width of the article to be sold.

Just in front of the shelf C is arranged a sliding board E, having secured at each end a metal bar F, to the upper and lower ends of which are secured small rollers or wheels G that run upon guide rods or bars H that extend from the top to the bottom of the casing A. To the upper ends of the metal bars F, just above the sliding board E, is secured a plate I, from the rear end of which projects a wire frame J. The object of this frame is to retain the papers or other articles of merchandise in place, so that the upper one will be caused to pass between the plate I and the upper edge of the sliding board E, and be delivered upon a shelf K, secured to the sliding board E, just below its upper edge.

To the rear of the sliding board E is secured a rack L, that is in gear with a toothed wheel M, mounted upon a shaft N, the wheel M being in gear with a pinion P on shaft Q, upon which is also mounted a cog-wheel R, that is in gear with a pinion S, mounted upon a shaft T, upon which is secured a cog-wheel U, that is in gear with a pinion V upon a shaft W. Upon one end of the shaft W is secured a crank $w$, by means of which the sliding board E can be raised to the desired height. On the end of this shaft is mounted a cog-wheel X, that is in gear with a pinion Y, mounted upon a shaft Z, that also carries a fan Z'. Upon the end of the shaft T is secured a ratchet-wheel $a$. All of these shafts are mounted in a suitable frame 1, secured to the support of the shelf C, and on the end of the frame at $c$ is fulcrumed a pawl $b$, that fits into the teeth of the ratchet-wheel $a$, and has an extended tail $b'$. In the upper side of the pawl $b$ is cut a notch, in which fits the end of a pawl $d$, fulcrumed at $e$ to the frame 1, and having an extended tail $d'$. This pawl is pressed down and kept in contact with the pawl $b$ by means of a spring $f$. The two tails $b'\ d'$ of the pawls extend to the bottom of the chute 2, the upper end of which is connected to a coin-distributer 3, into which the coins to operate the apparatus are passed through a short chute 4, having a slot or opening 5. From the lower end of the coin-distributer 3 is another chute 6, (shown broken off in the drawings,) through which the first coin that is dropped into the slot passes and is carried off to any desired place, while the second coin passes down the chute 2 and strikes the tail $d'$ of the pawl $d$, thereby releasing the apparatus, as hereinafter more fully described, it being intended to employ two coins—say two pennies—as in purchasing an ordinary daily paper, so that the first coin does not operate the apparatus, but the second does, and after it has passed down the chute and struck the tail $d'$ it is carried to a box or receptacle 7 by means of a guide 8, which may, as shown, be cast in one with the frame 1 or may be attached thereto.

In front of the sliding board E are arranged two bars 9 9, that are hung to one end of rods 10, which stand at an angle, as shown, the other ends of which are connected to rods or shafts 11 12, the lower one 11 being mounted in a bracket 13, secured to the front portion of the casing, and the upper shaft 12 extends entirely across the box and is mounted in bearing 14, secured to the sides thereof. To each of these shafts 11 12 is connected an arm 15 16, the outer ends of which are connected together by a rod 17, thus forming, as it were, a parallel frame. To the outer end of the rod or shaft 12 is secured an arm 18, to which is fastened one end of a rod 19, the lower end of which is formed into a loop that passes through an eye 20 on the tail $b'$ of the pawl $b$, so that as a paper passes out it strikes the two rods 9 and forces them forward, thus imparting motion to the parallel frame and causes the rod 19 to draw up the tail $b'$, thus throwing the pawl $b$ into contact with the ratchet-wheel $a$, when the pawl $d$ is pressed by the spring $f$ into the notch in the pawl $b$, thus securely locking it until again released by a coin striking the tail $d'$. To the bar or shaft 12 is also secured an arm 21, upon which is mounted a weight 22 to counterbalance the rectangular frame and cause it to assume its normal position. After the paper passes over the sliding board E and strikes the bars 9 it falls upon a platform or conduit 23, down which it slides and passes out through an opening 24 in the front of the casing onto a catch or rest 25.

To the upper end of one of the bars F is secured an arm 26, the outer end of which is curled or provided with a hole through which a rod 27 is passed. The upper end of this rod is connected to a lever 28, fulcrumed at one end to a bracket 29, and the other end is connected to a slide 30. The lever 28 is held in its normal raised position by a spring 31. The lower end of the rod 27 is screw-threaded, and is provided with a nut 32 and spiral spring 33, so that when the end of the arm 26 comes into contact with the spring 33 it draws the rod 27 down, thereby drawing the slide 30 over the opening or slot 5, so that no more money can be passed into the machine, thereby indicating that it is empty.

Figures 8, 9, 10, 11, 12, 13, 14, 15, 16, 17, 21:
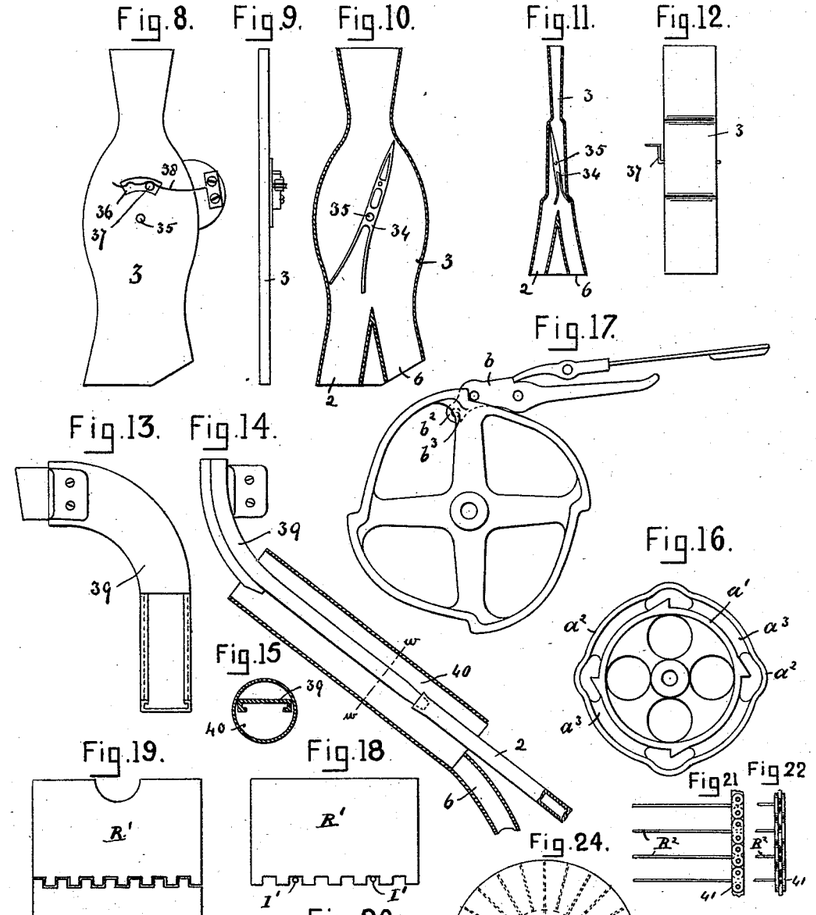

In Figs. 8, 9, and 10 we have shown detail views of the coin-distributer. This consists of a flat metal casing 3 of the form shown, having mounted thereon a gate 34, that is fulcrumed at or about its center 35, so as to counterbalance itself. The lower portion is divided, so as to form two passages that reach to the chutes 2 6. The casing on one side is provided with an opening 36, through which passes a small pin or stud 37, upon which a spring 38 (mounted and bent to the form shown) presses, so that when the gate is moved to one side or the other it is locked by the spring. This distributer is intended for use when the coin is put in edgewise; but if it is desired to put the coin in flat, then we employ a distributer, as shown in Figs. 11 and 12, which is practically of the same construction, but is operated by the thickness of the coin, and it can be of sufficient width to receive coins of the largest size and value, and yet be as readily operated by coins of the smallest size.

To the ends of the coin-distributers may be connected a coin-separator of the construction shown in Figs. 13, 14, and 15, which consists of a chute 39, closed at its upper end on all sides, and immediately below this closed portion it is open on its under side, only sufficient space being left on each side to retain a coin of the proper denomination. The end of this separator connects with the chute 2. Around the open portion is a tubular piece 40, into which will fall all coins of a less diameter than the proper coin, and will be carried off by the chute 6.

Instead of the ratchet-wheel $a$, a ratchet-wheel of the form shown in Fig. 16 may be employed, and this is particularly applicable when the sliding table is to be let down a given distance or when the article to be passed out of the salesman is carried by shelves, as shown and described with reference to the change-maker. In this case the ratchet-wheel $a'$ is provided with any desired number of teeth. In the drawings we have shown four, and beyond the outer edge of the teeth is a rim $a^2$, that forms a groove $a^3$ of about an equal width throughout, in which groove a pin on the end of the pawl-lever travels, so that after the wheel has been released it will travel a certain distance. The pin on the lever will then come into contact with the next tooth of the wheel, thus locking it until again released; or instead of a rim beyond the teeth, as just described, the wheel might be formed as shown in Fig. 17, in which a rim is formed all around and the pawl-lever $b$ is formed with a nose $b^2$, carrying a pin $b^3$, that runs under the rim, thereby allowing the pawl to rise only sufficient to clear a tooth.

Figure 4:
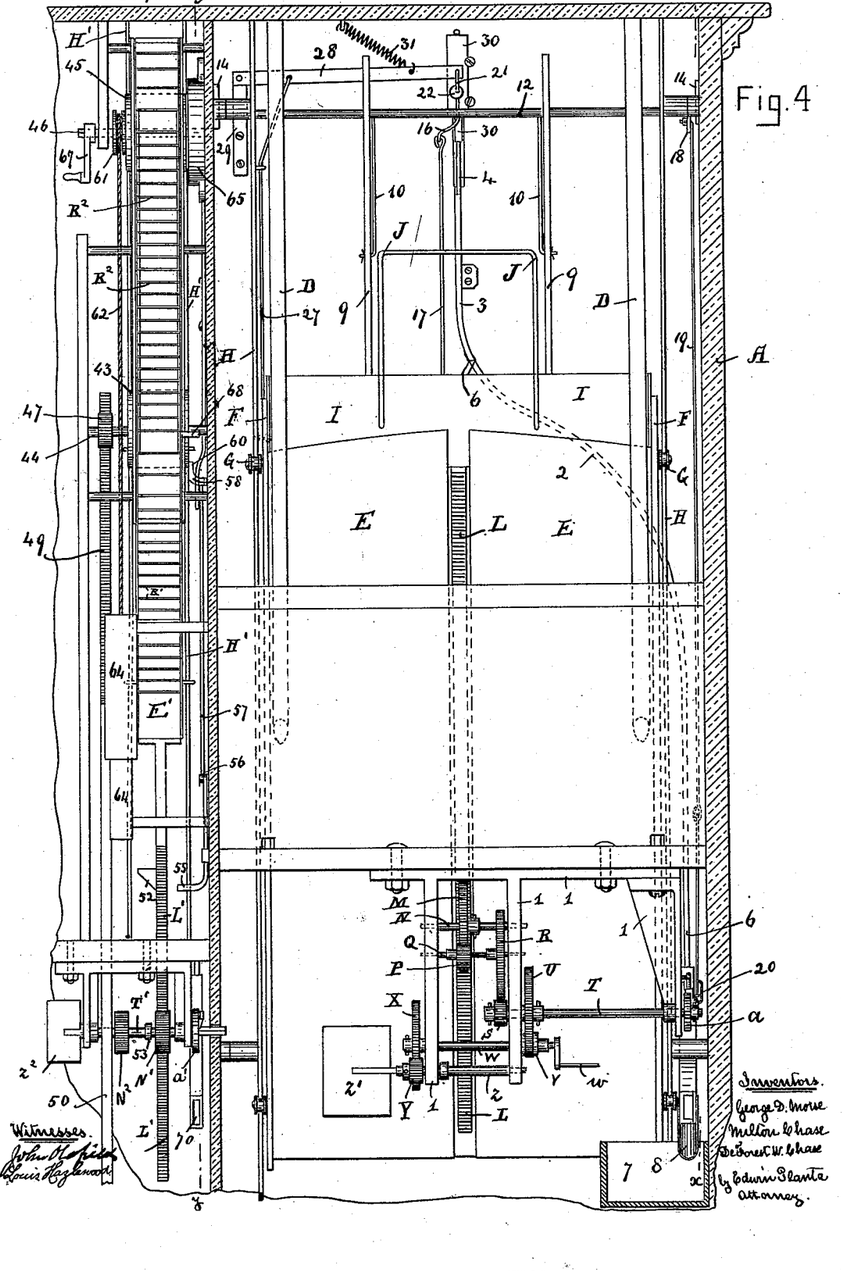
Fig. 4 is a front view of an automatic salesman and change-maker embodying our invention, the case being shown in section.
Figure 5:
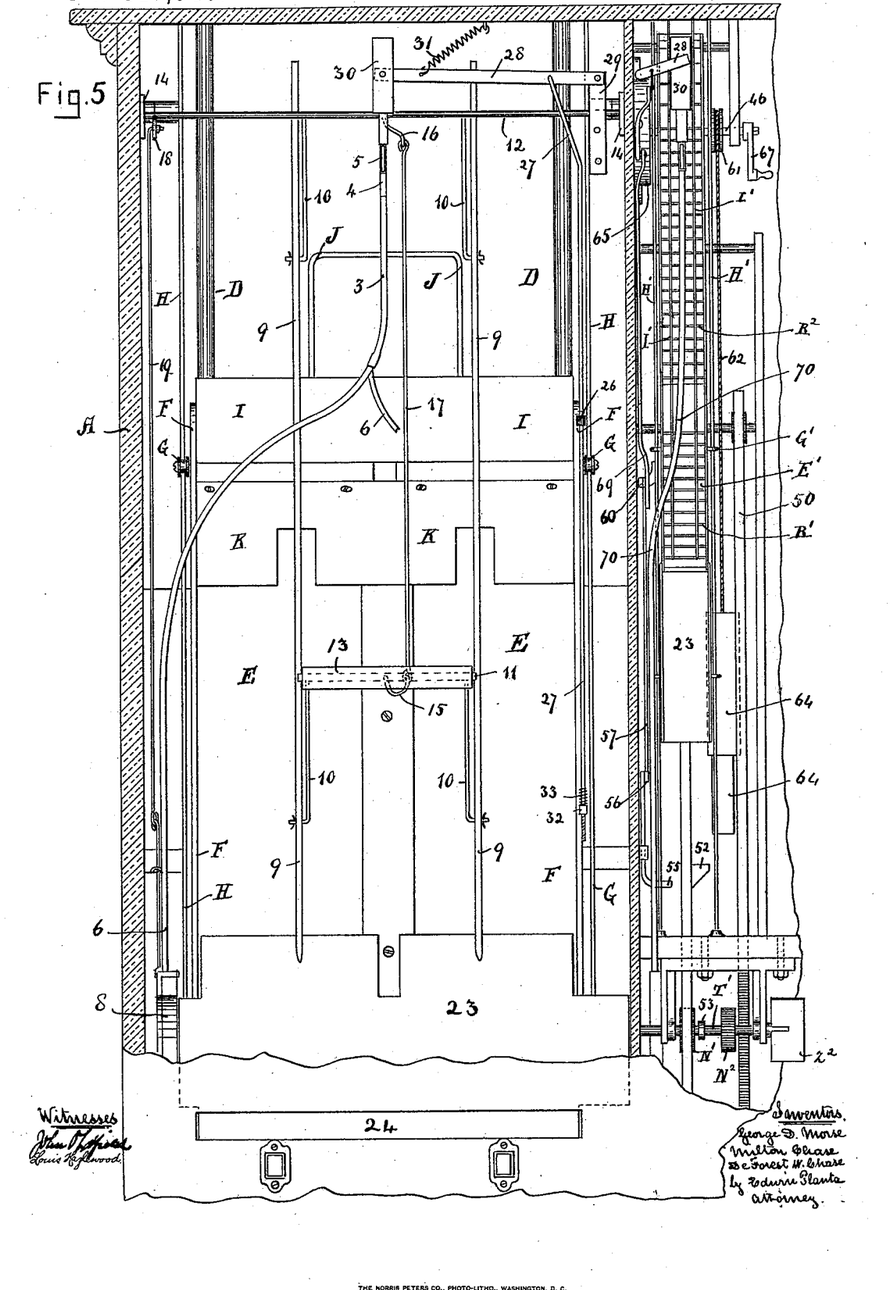
Fig. 5 is a rear view of the same, the case being shown in section.
Figure 6:
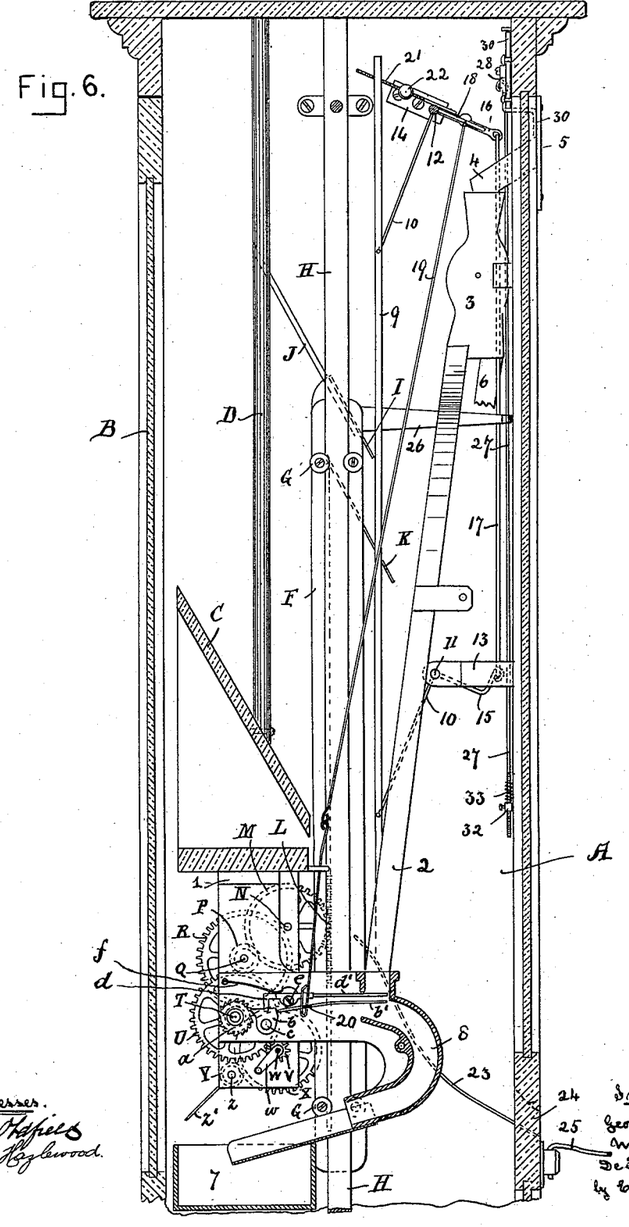
Fig. 6 is a vertical section taken on line $x\ x$ of Fig. 4.
Figure 7:
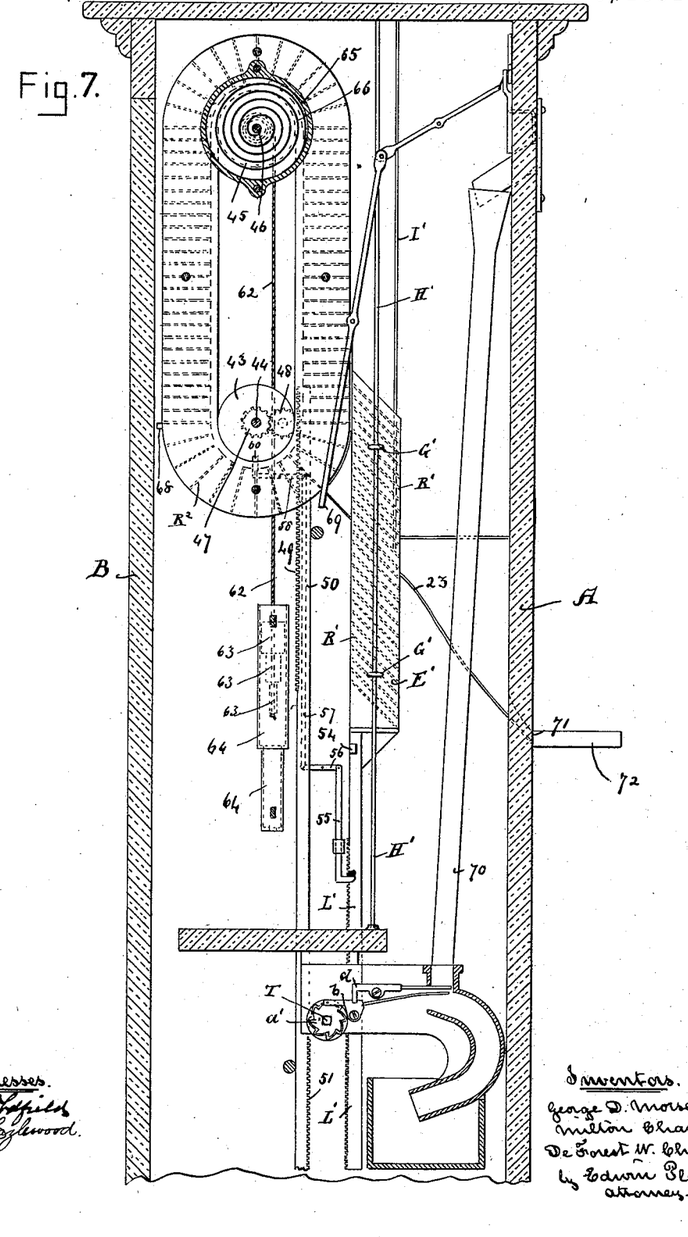
Fig. 7 is a vertical section taken on line $y\ y$ of Fig. 4.

In the drawings, Fig. 7, we have shown the change-maker fitted with a ratchet $a'$, the same as shown in Fig. 15, only with eight teeth. When a wheel of this description is employed, less gears and only one shaft are required to operate the apparatus—the shaft T, upon which the ratchet-wheel is mounted, carrying a pinion N′, (see Figs. 4 and 5,) that gears directly with the rack L′. On the outer end of this shaft is also mounted a fan $Z^2$ to regulate the speed of the fall of the rack L′, the upper end of which carries a sliding frame E′, fitted with a number of shelves R′, set at any required angle. To the sides of this frame are fitted eyes G′, that run upon rods H′.

The front of the plates or shelves R′ are recessed, as shown in Fig. 18, and two more rods I′ extend down so as to leave just sufficient room for the article to pass between their lower ends and the platform 23, or a plate provided with projections corresponding to the recesses in the shelves might be employed. At the rear of the frame E is fitted an auxiliary supply-frame consisting of a chain or belt carrying a number of shelves $R^2$ similar to the shelves R′, and upon which the articles to be delivered are placed. In Figs. 21 and 22 we have shown the shelves $R^2$ connected to a chain 41, and in Fig. 23 we have shown them connected to a belt 42. The chain or belt carrying these shelves pass over two drums 43 45, mounted upon shafts 44 46, carried by suitable frames. Upon the lower shaft 44 is mounted a pinion 47, that is in gear with another pinion 48 in gear with a rack 49 on one side of a rack-bar 50, the lower end of which bar is formed with a rack 51, which is driven by a pinion $N^2$, (see Figs. 4 and 5,) that is thrown into gear therewith just as the rack L′ is lowered to its greatest extent by means of a cam 52 (see Fig. 4) coming into contact with an arm 53 upon the shaft T′, thus pushing the shaft to one side and throwing the pinion N′ out of gear with the rack L′. To the side of the rack L′ is also secured a pin 54, which at the moment the gears N′ $N^2$ are shifted draws upon the end of a bar 55, the upper end of which is attached to a lever 56, fulcrumed at its center, and to the other end of which is connected a rod 57, the upper end of which is attached to one end of a lever 58, fulcrumed at its center, the outer end of which is formed with a bolt 60, that fits into a notch in the lower drum 43 and prevents the endless belt carrying the shelves $R^2$ from being moved until the frame E′ is at its lowest point.

To the shaft 46 is secured a grooved wheel 61, (see Figs. 4 and 5,) to which is attached a cord 62, upon which weights 63 are loosely secured. (See Fig. 7.) These weights 63 vary in size, the smallest being at the bottom, and they work in a tube 64, that is made to correspond to the size of the weight, and is provided with ledges, so that after the weights have traveled down a certain distance the upper weight will be supported upon one of the ledges, and then the next weight, after it has traveled the desired distance, will rest upon the next ledge, the smallest weight passing through the bottom of the casing.

65 is a fixed casing, to which one end of a helical spring 66 is secured, the other end being attached to the shaft 46. Upon the end of this shaft is mounted a crank 67, by which the spring 66 and cord 62 are wound up.

After all the shelves have been emptied a stud 68, consisting of a piece of metal secured to and projecting beyond the edge of one of the shelves—viz., the shelf that carries the last article to be delivered—comes into contact with a lever 69 and closes the slot in the manner before described, so that no more coins can be passed into the apparatus through the chute 70.

The edges of the shelves R′ $R^2$ where they come together are notched out, as shown in Fig. 19, so that any paper or package will not get caught between the joint, as would be the case if the edges were straight. The rear edge of the plate is also cut out, as shown, so that it can readily be seen if any of the shelves have been missed in filling the apparatus. For wide papers or packages furcated shelves, as shown in Fig. 20, may be employed. In Fig. 24 we have shown a modification of the endless belt. In this case only one drum is employed. The shelves being arranged around the same, as shown, its operation would be as before described.

In operation the shelves in the change-maker are filled with the proper change, preferably in envelopes, and the articles—in this case papers—are placed upon the shelf C between the bars D, the board E being raised to the required height. Now supposing a person wishes to make a purchase of a paper and he has not the proper coin—viz., two one-cent pieces—he drops a coin of greater value into the proper opening, which passes down the chute 70 and releases the pawls $d\,b$, thus freeing the ratchet-wheel $a'$ and allowing the frame E′, containing the change upon the shelves R′, to fall by its own weight just the distance of the space between the shelves, and the proper change falls down the platform 23 and passes out of the opening 71 into a tray 72. He then takes up the change and passes one of the pennies into the slot 5, which coin passes down through the distributer 3 into the chute 6. In its passage it moves the gate 34, so that when he drops the next penny into the slot it will be guided into the chute 2 and release the pawls $b\,d$, thus allowing the sliding board E to fall by its own weight until a paper slips over its upper end, which then falls upon the platform 23 and passes out of the slot 24 onto the rest 25. The paper in its passage comes into contact with the two bars 9, that cause the rod 19 to be drawn up, thus throwing the pawl $b$ into contact with the ratchet-wheel $a$ and stops the board E. After the last change or paper has passed out the slot is closed in the manner before described.

Figure 1:
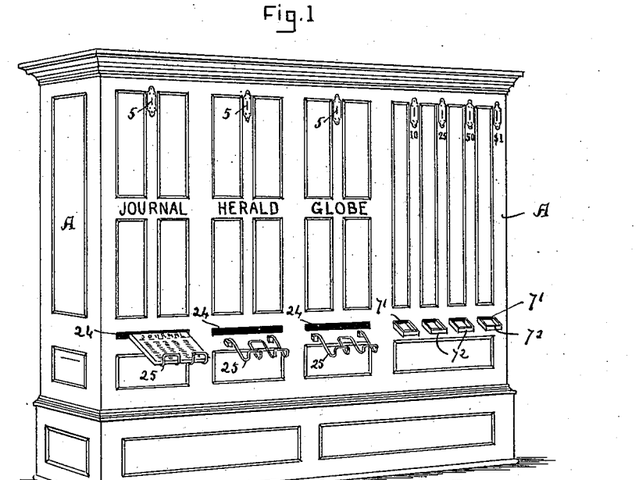
Figure 1 represents a perspective view of an automatic salesman and change-maker embodying our invention and adapted for selling three different kinds of newspapers, and provided with change-makers for four different denominations of coin.
Figure 2:
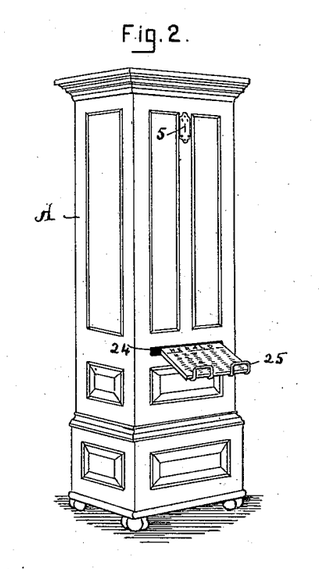
Fig. 2 is a perspective view of a salesman for one kind of newspaper or merchandise.
Figure 3:
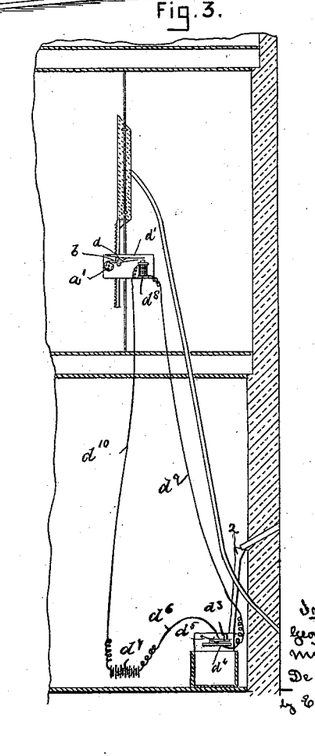
Fig. 3 is a vertical section of part of a building, showing the papers or merchandise on an upper floor, the mechanism being operated by the coin dropped in on the lower floor.

It will be seen that the apparatus can be arranged partly on one floor and partly on another, as shown in Fig. 3. In this arrangement the construction is substantially the same as before described; but instead of the coin falling directly upon the tail $d'$ of the pawl $d$, it falls upon a lever $d^3$, the outer end of which is held out of contact with a contact-piece $d^4$ by a spring $d^5$. The lever $d^3$ is by a wire $d^6$ connected to one pole of a battery $d^7$, the other pole being by a wire $d^{10}$ connected to an electro-magnet $d^8$, arranged under the tail $d'$ of pawl $d$, and the magnet is by wire $d^9$ connected to the contact-piece $d^4$, so that when a coin passes down the chute 2 it causes the lever $d^3$ to come into contact with the contact-piece $d^4$, thus completing the circuit, and the electro-magnet $d^8$ draws down the tail $d'$ of the pawl $d$ and releases the ratchet-wheel $a'$. As soon as the coin has passed the lever $d^3$, it is thrown back by the spring $d^5$, and the contact is broken, thereby allowing the pawl $b$ to come into contact with the next tooth of the ratchet-wheel and stop the apparatus. In this case a tube instead of a platform 23 would be employed to conduct the change or other article, and instead of an electro-magnet the connection might be made by a rod.

What we claim as our invention is—

1. A casing A, having a shelf C, set on an angle, guide-rods D, a sliding board E, having bars F and wheels G at each end, guide-rods H, a rack L, secured to the rear of the sliding board E, and clock-work mechanism, in combination with a chute 4, coin-director 3, chutes 2 6, pawls $b\ d$, and ratchet-wheel $a$, substantially as and for the purposes set forth.

2. A casing A, having a shelf C, set on an angle, a sliding board E, and suitable guides, a rack L, clock-work mechanism, ratchet-wheel $a$, pawls $b\ d$, and chute 2, in combination with a frame consisting of bars 9, rods 10, shafts 11 12, arms 15 16, rod 17, connecting the arms 15 and 16, an arm 18, and rod 19, substantially as and for the purposes set forth.

3. In an automatic salesman having a sliding board E, an arm 26, secured near the top thereof, the outer end of the arm embracing a rod 27, having a stop 32 at its lower end, its upper end being connected to a lever 28, carrying a slide 30, and a spring 31, substantially as and for the purposes set forth.

4. In an automatic salesman, the combination of a ratchet-wheel $a$, and pawl $b$, having a notch in its upper surface, with the auxiliary pawl $d$, substantially as and for the purpose set forth.

5. In an automatic salesman, a sliding frame having a series of shelves upon which change or articles to be sold are placed, said frame being carried by a rack in gear with suitable clock-work, a ratchet-wheel and pawls for regulating the movement of the frame, and bars to prevent more than one article passing out at a time, substantially as set forth.

6. In an automatic salesman having a sliding frame carrying a series of shelves, upon which change or articles to be sold are placed, said frame being carried by a rack, the combination of an auxiliary supply-frame consisting of a series of shelves, endless chains or belts mounted upon drums, to one of which a rotary motion is imparted, a spring and weight rack, gears, and suitable clock-work mechanism for automatically regulating the movement of both the sliding and auxiliary frames when a coin strikes the tail of a pawl in contact with a ratchet-wheel, substantially as set forth.

7. An automatic salesman or change-maker having a frame provided with shelves and an auxiliary supply-frame having shelves, a ratchet-wheel, pawls, and suitable clock-work mechanism, racks for regulating the movement of the supply-frame and auxiliary supply-frame, and means for automatically throwing the clock-work out of gear with the supply-frame rack and into gear with the auxiliary supply-frame rack, substantially as set forth.

8. In an automatic salesman or change-maker having a frame provided with shelves, an auxiliary supply-frame, and a bolt for retaining the auxiliary supply-frame stationary until the supply-frame is being emptied of its contents, and which first-mentioned frame then automatically withdraws the bolt to release the auxiliary supply-frame, substantially as set forth.

9. In an automatic salesman or change-maker, a ratchet-wheel having a wide rim on its outer edge and any desired number of teeth, in combination with a lever $b$, having a pin that rides on the outer edge of said rim and comes in contact with the teeth, and a nose $b^2$, carrying a pin $b^3$, that runs under the rim, substantially as set forth.

10. In an automatic salesman or change-maker, a coin-distributer consisting of a casing having a single opening at its upper end and two passages at its lower end, a gate fulcrumed in the center, whereby the coin as it is guided to one of the passages at the bottom sets the gate so as to guide the next coin into the other passage, in combination with the pin 37 and spring 38 for retaining the gate in position, substantially as shown and described.

11. In an automatic salesman or change-maker, a coin-distributer adapted to receive coins of any diameter and consisting of a casing having an opening at its upper end for the insertion of the coins, a gate fulcrumed at or near its center and operated by a sidewise-inserted coin, which is guided to one side by the gate and sets the same so as to guide the next coin to the opposite side, said gate having a pin or crank 37, in combination with a spring 38 for retaining the gate in position until moved by a coin, substantially as set forth.

12. In an automatic salesman or change-maker in which the movement is regulated by clock-work, a ratchet-wheel, and a pawl having a notch in its upper surface, and an auxiliary pawl for locking the pawl in contact with the ratchet-wheel, substantially as set forth.

13. In an automatic salesman or change-maker where the articles to be delivered are arranged upon shelves, shelves notched on their adjacent edges, whereby the line of junction is broken, substantially as and for the purposes set forth.

In testimony whereof we have signed our names to this specification, in the presence of two subscribing witnesses, on this 18th day of December, A. D. 1889.

GEO. D. MORSE.
MILTON CHASE.
DE FOREST W. CHASE.

Witnesses:
HORACE E. BARTLETT,
ADALINE E. FROST.